(12) United States Patent
Iliev et al.

(10) Patent No.: US 10,589,567 B2
(45) Date of Patent: Mar. 17, 2020

(54) WHEEL HUB ASSEMBLY FOR A VEHICLE WHEEL AND POLE RING OF AN ABS SENSOR

(71) Applicant: BPW Bergische Achsen KG, Wiehl (DE)

(72) Inventors: Rossen Iliev, Wiehl (DE); Reiner Siebel, Ruppichteroth (DE); Wilfried Wasserfuhr, Marienheide (DE)

(73) Assignee: BPW Bergische Achsen KG, Wiehl (DE)

( * ) Notice: Subject to any disclaimer, the term of this patent is extended or adjusted under 35 U.S.C. 154(b) by 510 days.

(21) Appl. No.: 15/306,524

(22) PCT Filed: May 5, 2015

(86) PCT No.: PCT/DE2015/100181
§ 371 (c)(1),
(2) Date: Oct. 25, 2016

(87) PCT Pub. No.: WO2015/169285
PCT Pub. Date: Nov. 12, 2015

(65) Prior Publication Data
US 2017/0043618 A1  Feb. 16, 2017

(30) Foreign Application Priority Data
May 9, 2014  (DE) .................. 10 2014 106 519

(51) Int. Cl.
*B60B 27/00* (2006.01)
*B60B 27/02* (2006.01)
*B62D 7/18* (2006.01)

(52) U.S. Cl.
CPC ...... *B60B 27/0068* (2013.01); *B60B 27/0073* (2013.01); *B60B 27/02* (2013.01);
(Continued)

(58) Field of Classification Search
CPC ........ F16C 41/007; G01P 3/443; G01P 3/488; B60B 27/0068; B60B 27/0073; B60B 27/02
See application file for complete search history.

(56) References Cited

U.S. PATENT DOCUMENTS

| 4,017,756 A | 4/1977 | Davidson |
| 4,259,637 A * | 3/1981 | Bloomfield ............. G01P 3/443 324/166 |

(Continued)

FOREIGN PATENT DOCUMENTS

| DE | 19827073 A1 * | 1/2000 | ............ B60T 1/065 |
| DE | 103 49 303 | 5/2005 | |

(Continued)

*Primary Examiner* — Scott A Browne
(74) *Attorney, Agent, or Firm* — Gudrun E. Huckett

(57) ABSTRACT

In order to provide solutions for soiling problems and corrosion problems in the area between a pole ring (41) and the hub interior, arranged behind it, of a wheel hub assembly having a wheel hub (1) which ends inside the vehicle in a hub section (50) whose internal circumference (15) defines an opening (55) for the central passage of the stub axle (6) and on which a fastening device (42) of a pole ring (41) of an ABS sensor is mounted, wherein a pulse generator section (43) which is embodied in one piece with the fastening section (42) is a component of the pole ring (41), which pulse generator section (43) extends from the fastening section (42) to the wheel hub axis (A) and is provided with openings (44, 44L) distributed uniformly in the circumferential direction; in a first embodiment the pole ring (41) extends with its pulse generator section (43) towards the wheel hub axis (A) to such an extent that the opening (55) between the wheel hub (1) and stub axle (6) is for the most part covered towards the interior of the hub. In a second embodiment, at least some of the openings or slots have an extent (RL) towards the outside which is greater than the
(Continued)

extent (R) which is necessary for sensing. Furthermore, it is proposed with respect to the pole ring (41) that some of the openings (44L) or slots have an extent (RL) towards the outside which is greater than the extent (R) of other openings (44) or slots.

17 Claims, 3 Drawing Sheets

(52) U.S. Cl.
CPC ... *B60B 2310/206* (2013.01); *B60B 2310/211* (2013.01); *B60B 2310/228* (2013.01); *B60B 2900/211* (2013.01); *B60B 2900/5112* (2013.01); *B60B 2900/5114* (2013.01); *B60Y 2200/10* (2013.01); *B60Y 2200/20* (2013.01); *B62D 7/18* (2013.01)

(56) References Cited

U.S. PATENT DOCUMENTS

| | | | |
|---|---|---|---|
| 4,795,278 A | | 1/1989 | Hayashi |
| 5,449,237 A | * | 9/1995 | Seo ................... F16C 19/185 |
| | | | 384/448 |
| 5,470,157 A | * | 11/1995 | Dougherty .......... F16C 33/7886 |
| | | | 324/207.25 |
| 6,457,869 B1 | * | 10/2002 | Smith ................... B60B 27/001 |
| | | | 384/448 |
| 7,610,998 B2 | | 11/2009 | Baumgartner et al. |
| 2004/0061493 A1 | * | 4/2004 | Fishburn ................. G01P 3/443 |
| | | | 324/173 |

FOREIGN PATENT DOCUMENTS

| | | |
|---|---|---|
| DE | 10 2011 000 626 | 8/2012 |
| EP | 0 675 364 | 10/1995 |

\* cited by examiner

WHEEL HUB ASSEMBLY FOR A VEHICLE WHEEL AND POLE RING OF AN ABS SENSOR

BACKGROUND OF THE INVENTION

The invention relates firstly to a wheel-hub assembly for a vehicle wheel, with a wheel hub which is arranged so as to be capable of rotating on a torsion-resistant steering knuckle via a hub bearing assembly and which terminates inside the vehicle in a hub neck, the inner periphery of which defines an opening for the central passage of the steering knuckle, and on which an attachment portion of a pole ring of an ABS sensor is mounted, wherein a component of the pole ring is a pulse-generator portion integrally formed with the attachment portion, which extends, starting from the attachment portion, toward the wheel-hub axis. The invention further relates to a wheel-hub assembly as described, which is provided with openings, preferentially slots, uniformly distributed in the peripheral direction.

The invention relates further to a pole ring for an ABS sensor for sensing the rotation of a vehicle wheel, with an attachment portion for mounting the pole ring on a hub of the vehicle wheel, and with a pulse-generator portion integrally formed with the attachment portion, which extends, starting from the attachment portion, as a ring, closed in the peripheral direction, toward the pole-ring axis and is provided with openings, preferentially slots, uniformly distributed in the peripheral direction. Such a pole ring is particularly suitable for use in a wheel-hub assembly according to the invention.

A wheel-hub assembly with pole ring of the afore mentioned kind is known from DE 10 2011 000 626 A1. The wheel hub is arranged so as to be capable of rotating on a torsion-resistant steering knuckle via a hub bearing assembly, and terminates inside the vehicle in a hub neck, the inner periphery of which defines an opening for the central passage of the steering knuckle on which the wheel hub is supported in a bearing so as to be capable of rotating. The outer periphery of the hub neck is designed to attach the pole ring of an ABS sensor. For this purpose the pole ring is provided with an attachment portion which is supported from the outside on the outer periphery of the hub neck. A component of the pole ring is, furthermore, a pulse-generator portion which is integral with the attachment portion of the pole ring and which, starting from the attachment portion, extends toward the central axis of the wheel hub. On the pulse-generator portion the pole ring is provided with slots uniformly distributed in the peripheral direction. The ABS sensor is attached in the region of the steering knuckle in such a way that it is situated exactly opposite the slots and in this way senses the speed of rotation of the pole ring and converts said speed into a corresponding control signal of an anti-lock braking system or, in the case of a driven vehicle axle, into a control signal of a drive control system.

A similarly constructed assembly consisting of a wheel hub and a pole ring attached thereto is known from DE 103 49 303 B3, for example.

A feature that is common to the wheel-hub assemblies of the prior art is that, viewed from the interior of the hub, the pole ring arranged on the vehicle-interior opening of the wheel hub constitutes a step or edge on which, if the peripheral portion in question is located underneath, dirty water or even fine particles of dirt can settle and accumulate. As a consequence, and depending on the materials being used, the formation of rust may occur there in the course of time. This effect is intensified the more dirt gets behind the pole ring from inside the vehicle and such dirt then accumulates between the pole ring and the bearing seal arranged behind it in the interior of the hub. This dirt—above all, coarse dirt—may also result in the described corrosion problems in the course of time. The consequences may be an inseparable sticking of the pole ring to the hub, or an inadequate true running of the pole ring, which once again has consequences for the accuracy of the ABS sensor signal.

The object underlying the invention is therefore to create solutions for the contamination problems and associated corrosion problems in the region between the pole ring and the interior of the hub arranged behind it.

SUMMARY OF THE INVENTION

For the purpose of achieving this object there are proposed, on the one hand, a pole-ring-containing wheel-hub assembly characterized in that the pole ring with its pulse-generator portion extends so far toward the wheel-hub axis that the opening between the wheel hub and the steering knuckle is, for the most part, covered toward the interior of the hub, or characterized in that at least some of the openings or slots exhibit an outward extent that is larger than the extent necessary for the sensing and, on the other hand, a pole ring characterized in that some of the openings or slots exhibit an outward extent that is larger than the extent of other openings or slots.

A feature that is common to these technical solutions is that the contamination problems normally caused by automotive operation in the region of the wheel hub situated behind the pole ring are eliminated, but at least distinctly reduced, by technical measures beginning on the pole ring. In this way, corrosion problems, for example, can be diminished.

This is achieved in the case of the wheel-hub assembly as claimed in that the pole ring with its pulse-generator portion extends so far toward the wheel-hub axis that the opening between the wheel hub and the outside of the steering knuckle is, for the most part, covered toward the interior of the hub by the pulse-generator portion.

In this assembly, the size and area of the pole ring, in conjunction with the design of the hub, but also of the steering knuckle, has the result that a barrier is created, by which at least the penetration of coarse particles of dirt into the region behind the pole ring and hence into the interior of the hub is distinctly reduced. This effect is achieved all the better, the greater the covering of the opening between the wheel hub and the outer periphery of the steering knuckle that is achieved by the pole ring.

For a sufficient covering, the pole ring should cover this opening in a proportion amounting to at least 80%, relative to the cross-sectional area of the opening. Conversely, in this case the width of the residual gap between the edge of the pole ring facing toward the steering knuckle and the outside of the steering knuckle amounts to at most 20% of the radial clearance between the inside of the wheel hub and the outside of the steering knuckle.

If the pulse-generator portion is provided with slots uniformly distributed in the peripheral direction, the residual gap still remaining by reason of the covering by the pole ring should preferentially be equal to or less than the width of the slits. Particles and—above all—small stones that can no longer pass through the slots on account of the small width thereof are then reliably held back also in the region of the remaining width of the residual opening.

For the purpose of achieving the stated object, with the wheel-hub assembly as claimed it is proposed that at least some of the openings or slots that the pole ring exhibits on its pulse-generator portion exhibit an outward extent that is larger than the extent necessary for the sensing by the ABS sensor element.

In this way, it is ensured that dirty water or even small particles that has/have penetrated into the region behind the pole ring can escape through the outwardly elongated openings or slots, even when the peripheral portion in question of the pole ring or of the wheel hub is located underneath.

This type of drainage is especially successful in the case of a pole ring for a wheel-hub assembly of a heavy-duty commercial-vehicle axle if the outward extent is between 2 mm and 10 mm larger than the extent necessary for reliable sensing by the ABS sensor unit.

For the purpose of achieving the stated object, a pole ring of an ABS sensor for sensing the rotation of a vehicle wheel is proposed, wherein some of the openings or slots exhibit an outward extent that is larger than the extent of the other openings or slots.

For reasons of mechanical strength of the pole ring, the radial extent of the non-elongated openings or slots is as small as possible and is restricted to the extent technically necessary for the sensing by the ABS sensor. By virtue of the individual elongated openings or slots, on the other hand, liquid and fine dirt that has accumulated behind the pole ring can escape, this holding true even in the case where the peripheral portion in question of the pole ring is located underneath.

Another configuration provides that, for the purpose of mounting the pole ring, the outer periphery of the wheel hub is machined in the attachment region and provided with a rust-inhibiting layer or with a rust-inhibiting lacquer coating.

Preferred, furthermore, is a configuration in which the pole ring is pressed onto the outer periphery of the wheel hub and is held there exclusively by frictional engagement.

With further configurations, it is proposed for the pole ring that the axial support thereof takes place exclusively on an end face formed between the inner periphery and the outer periphery of the hub neck, and that for a high mechanical strength of the pole ring the pulse-generator portion thereof is provided with a reinforcing bead on its inner edge. The outer edge of the bead then determines the remaining width of the residual opening, which is no longer passable for coarser particles, of the pole ring in relation to the axle element.

In order to improve the drainage or the liberation from fine dirt additionally, in the transition between the end face and the inner periphery the hub neck may have been provided with a circumferential oblique chamfer. The oblique chamfer preferentially exhibits an angle of between 20° and 65° with respect to the wheel-hub axis, and a radial extent of at least 2 mm.

The outwardly enlarged or elongated slots formed on the pulse-generator portion of the pole ring should, for sufficient drainage, exhibit an extent that reaches at least as far as the radius of the inner periphery of the hub neck, and preferentially, in the case of a circumferential chamfer which is present in the transition between the end face and the inner periphery of the hub neck, an extent that reaches outward as far as the largest radius of this chamfer.

BRIEF DESCRIPTION OF THE DRAWINGS

An embodiment of the invention is elucidated in the following description, wherein reference is made to the drawings. Shown therein are.

DESCRIPTION OF PREFERRED EMBODIMENTS

Figure 1:
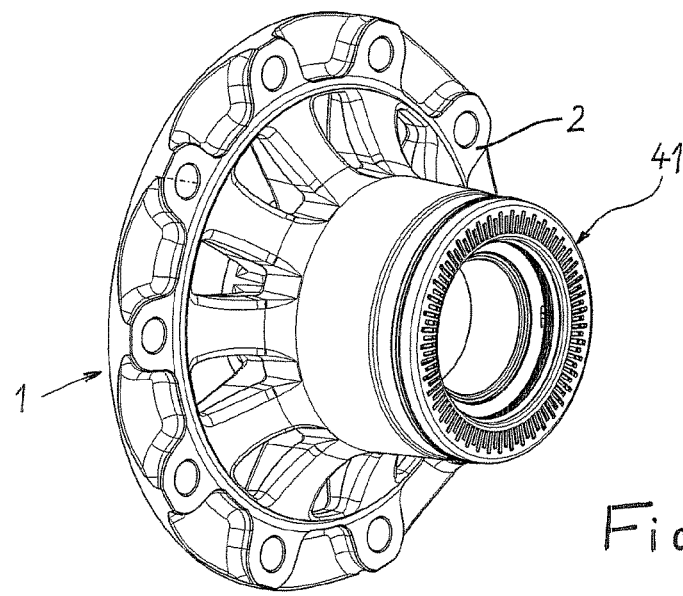
FIG. 1 in perspective representation, a wheel hub for a vehicle wheel with a pole ring mounted thereon which is a component of an apparatus for detection of speed and/or direction of rotation on the wheel hub.

FIG. 1 shows a wheel-hub unit which in the mounted state is arranged on a steering knuckle 6 (FIG. 3) so as to be capable of rotating. Two such steering knuckles 6 are preferentially located at the ends of an extended axle beam reaching from one side of the vehicle to the other. A brake disk 4 on one side, and the vehicle on the opposite side, may have been attached to an outer flange 2 of the wheel hub 1 by means of wheel bolts 7. For this purpose, attachments with bores for passing the wheel bolts 7 through are located in the flange 2 of the wheel hub 1. Such an attachment and bearing assembly of a wheel is suitable, above all, for non-driven vehicle axles—for example, revolving axles of truck trailers.

Figure 3:
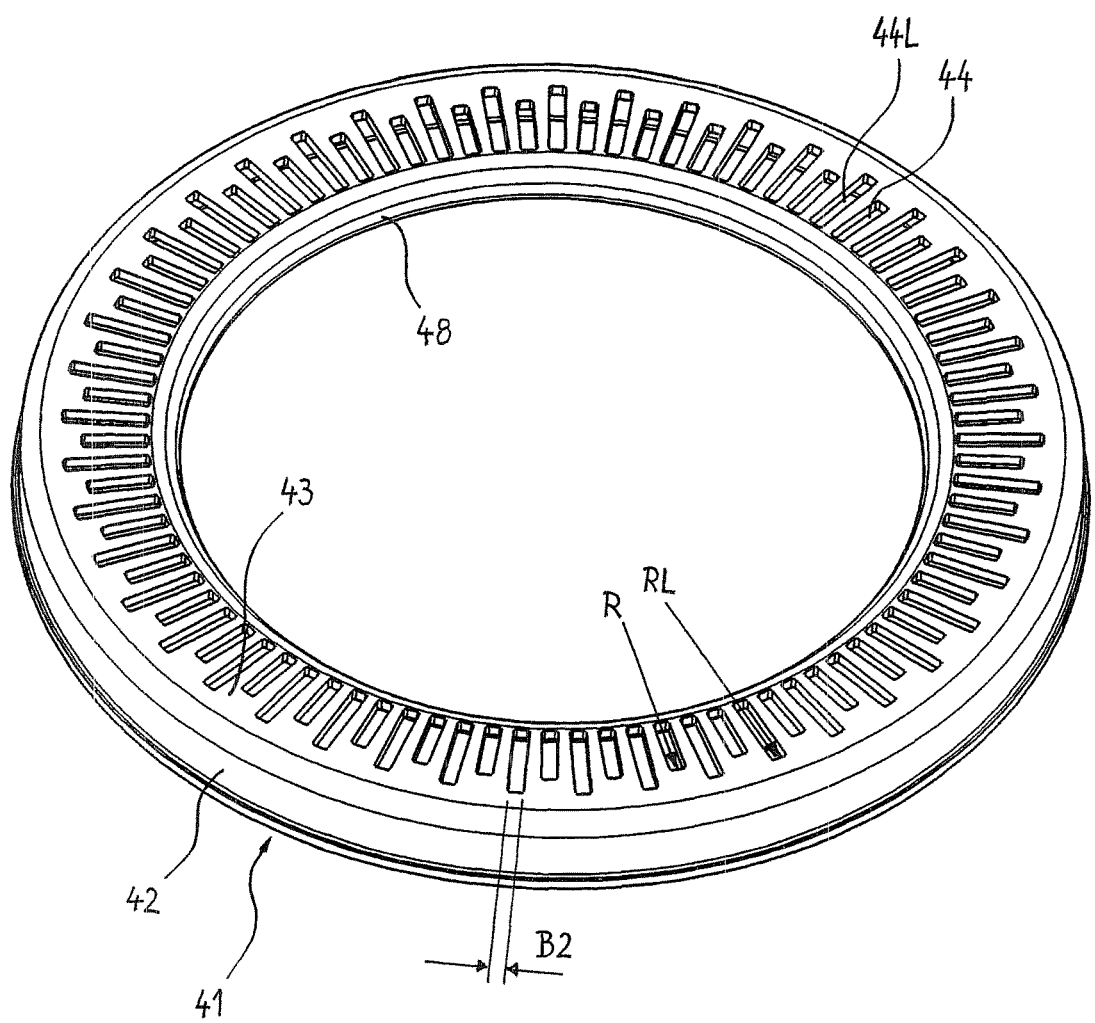
FIG. 3 a perspective view of the pole ring only.

According to FIG. 3, the axle element 6 is designed as a steering knuckle tapering toward the outside of the vehicle, on which bearing seats for an inner roller bearing 5A and an outer roller bearing 5B of a roller bearing assembly are formed. On the roller bearing assembly arranged in this way in the interior of the hub the wheel hub 1 is accordingly supported in a bearing so as to be capable of rotating.

Inward of the inner roller bearing 5A the axle element 6 exhibits a step. The inner ring of the roller bearing 5A is supported against the step, with axial interposition of a ring 10. On account of its support against the axle element, the ring 10 is designed to be fixed. The outer edge of the ring 10 exhibits a small radial clearance in relation to the inner periphery 15 of the wheel hub 1.

Further inside the vehicle, a circumferential groove is formed on the inner periphery 15 of the wheel hub, into which a circlip 16 has been inserted. The latter forms a radial projection in comparison with the inner periphery 15 of the wheel hub, with the aid of which the hub 1, inclusive of the hub bearing assembly, can be pulled down as a unit from the steering knuckle 6 toward the outside.

Toward the interior of the vehicle—that is to say, toward the center of the vehicle—the roller bearing assembly is sealed by a seal 17 arranged in prolongation of roller bearing 5A. The seal 17 includes the aforementioned rigid ring 10 and, in addition to that, an assembly of bipartite construction consisting of an inner ring and an outer ring. The inner ring and the outer ring are arranged in such a way with respect to one another that an interleaving is obtained in the axial direction.

The inner roller bearing 5A and the outer roller bearing 5B—together with the seal 17 consisting of the ring 10, the inner ring and the outer ring—form the hub bearing assembly of the wheel hub. One peculiar feature of this hub bearing assembly consists in the fact that, together with the wheel hub 1 and the roller bearing assembly, it can be removed from the steering knuckle 6 to the outside of the vehicle. The basic principle for this is described in EP 0 407

719 B1. In the course of removal, the seal 17 of the hub bearing assembly is gripped from behind by the circlip 16 fixed to the wheel hub 1 on the inside and serving as radial projection. This is possible, since the outside diameter of the seal 17 is larger than the inside diameter of the circlip 16. In the course of removal of the wheel hub 1, the circlip 16 comes up against the outer ring, the latter, for its part, transmits the tensile forces axially to the ring 10, as a result of which the ring 10, in turn, transmits the axial force to the roller bearing 5A, and all these parts are driven by entrainment. Once the wheel hub 1 has been removed from the axle element 6, all the parts of the hub bearing assembly—that is to say, the roller bearing assembly, the ring 10 and the multi-part seal 17—can be pulled out of the wheel hub 1 after loosening of the circlip 16.

As a component of an electrical apparatus for detection of speed and/or direction of rotation, a sensor 40—for example, an ABS sensor operating inductively—is attached to the axle element 6. The sensor 40 is seated relatively tightly in a mounting sleeve 40a surrounding the sensor, which, for its part, is rigidly attached to or within the axle element 6.

Situated directly opposite the sensing end of the sensor 40 with very small clearance, a pole ring 41 is mounted on the wheel hub 1, which accordingly revolves with the wheel hub 1 and is a component of the wheel-hub assembly.

For its mounting on a hub neck 50 of the wheel hub forming the vehicle-interior end of the wheel hub 1, the pole ring 41 exhibits an attachment portion 42. A component of the pole ring 41 is, furthermore, a pulse-generator portion 43 which, starting from the attachment portion 42, extends inward across the end face 45 at the end of the hub neck 50. On its radially inner edge, the pulse-generator portion 43 is provided with a bead 48 which results in a strengthening of the pole ring 41 in relation to bending loads, this being an advantage for the process of mounting the wheel-hub assembly.

The pulse-generator portion 43 is provided with openings 44, 44L, here in the form of radial slots of differing length uniformly distributed over its periphery. These openings 44, 44L—or, to be more exact, the regions between these openings—can be detected by the sensor 40 which is fixed with respect to the axle. The pole ring 41 is in one piece and it consists of inexpensive sheet metal which is worked by bending and stamping and is provided with the slots 44, 44L.

The mounting of the pole ring 41 therefore takes place on the hub neck 50 of the hub extending toward the interior of the vehicle. This longitudinal portion of the wheel hub 1 exhibits a distinctly smaller diameter in comparison with the attachment flange 2. With its inner periphery 15 the hub neck 50 defines an opening 55 for the central passage of the axle element 6, and on its outer periphery 51 it defines a cylindrical surface on which the pole ring 41 is mounted.

The pole ring 41 is axially supported only against the worked, preferentially machined, end face 45 of the hub. This results in a very precise true running of the pole ring, and hence in an exact sensor signal. In addition, this location of the axial support results in an improved strength of the pole ring, since the latter can better accommodate or withstand bending loads during the mounting process.

The hub neck 50 is of such length that on the inside it receives at least parts of the multi-part hub bearing assembly, namely the seal 17, the ring 10 and also possibly the inner roller bearing 5A. In order nevertheless to keep the axial length of the hub neck 50, and hence also the overall axial length of the wheel hub 1, slight, the pole ring 41 is not attached to the inner periphery 15 of the hub neck 50, where the hub bearing assembly and the circlip have already been arranged and take up space correspondingly. Instead of this, the attachment of the pole ring 41 takes place on the outer periphery 51 of the hub neck 50. In this case the attachment portion 42, viewed in the longitudinal direction of the hub, reaches beyond the seal 17 of the hub bearing assembly.

Although the pole ring 41 is axially supported against the end face 45, on the outside it is held on the wheel hub 1 by frictional engagement by means of press fitting. For this purpose, the attachment portion 42, designed as a cylindrical sleeve, is placed onto the cylindrical surface, jointly machined with the end face 45 in accurately fitting manner, on the outer periphery 51. The surface worked in such a way has additionally been treated with a rust inhibitor such as a suitable lacquer coating, for example.

The pulse-generator portion 43 performs, in addition to its ABS generator function, the function of a barrier to a penetration of coarser particles of dirt into the interior of the hub—that is to say, into the region of the hub situated behind the pole ring 41. This applies, above all, to such particles of dirt having a diameter that is larger than the width of the slots 44, 44L. This is because such particles—above all, small stones—are reliably held back by the barrier.

For this purpose, the pulse-generator portion 43 extends so far toward the central axis A of the wheel hub, and hence toward the central axis of the pole ring, that the annular opening 55 actually present between the inner periphery 15 of the wheel hub 1 and the outside of the steering knuckle 6 is closed up or covered over its major part, namely in a proportion amounting to at least 80%, relative to the actual cross-sectional area of the opening 55, toward the interior of the hub. For a high degree of coverage, not only the inside of the hub 1 but also the outer periphery of the axle element 6 in the region of the opening 55 should exhibit a circular cross section, as a result of which small radial tolerances are possible.

Figure 2:
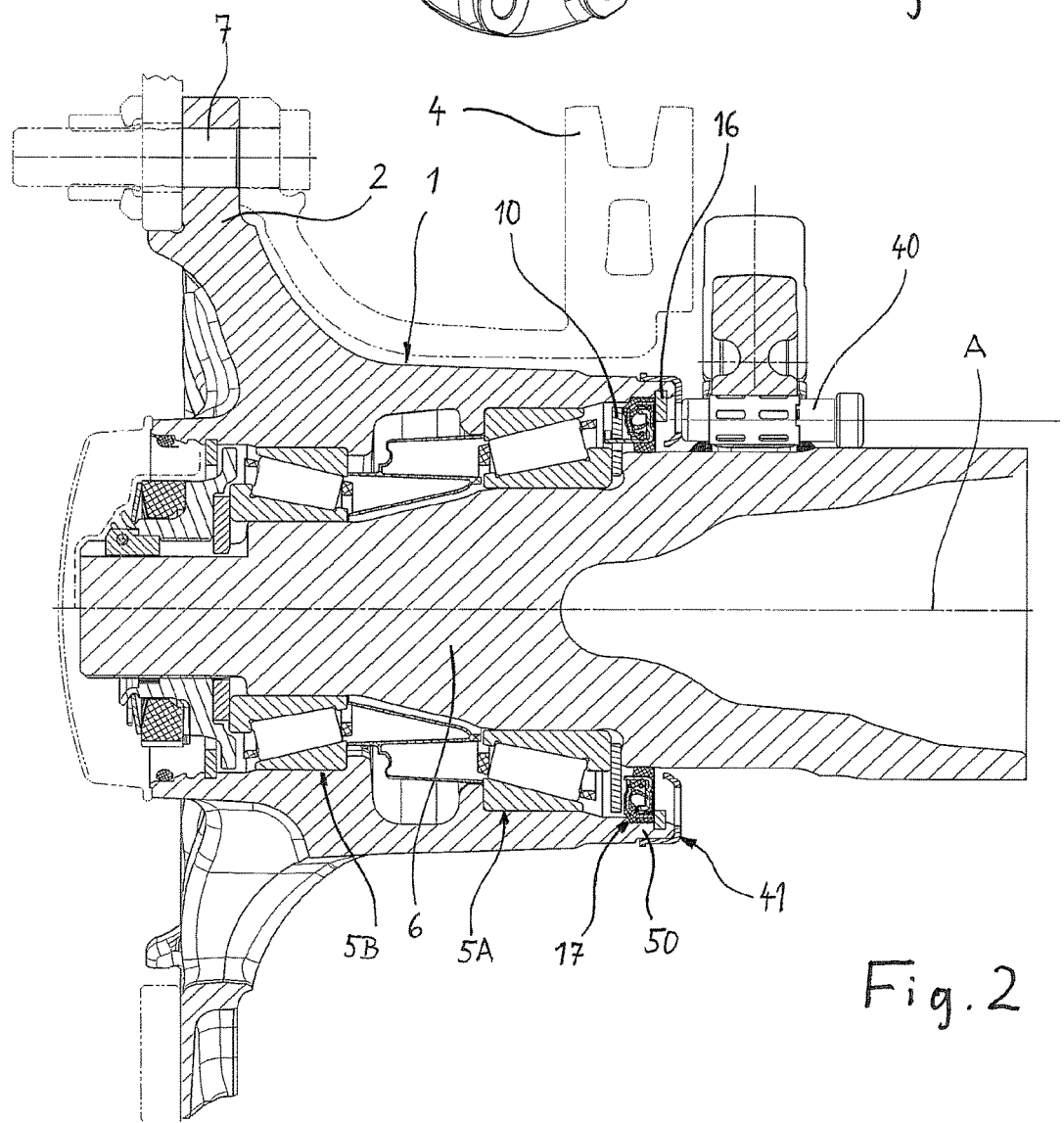
FIG. 2 a section through the wheel hub supported in a bearing on a central steering knuckle so as to be capable of rotating, with the pole ring attached thereto, wherein an ABS sensor is additionally reproduced.
Figure 2A:
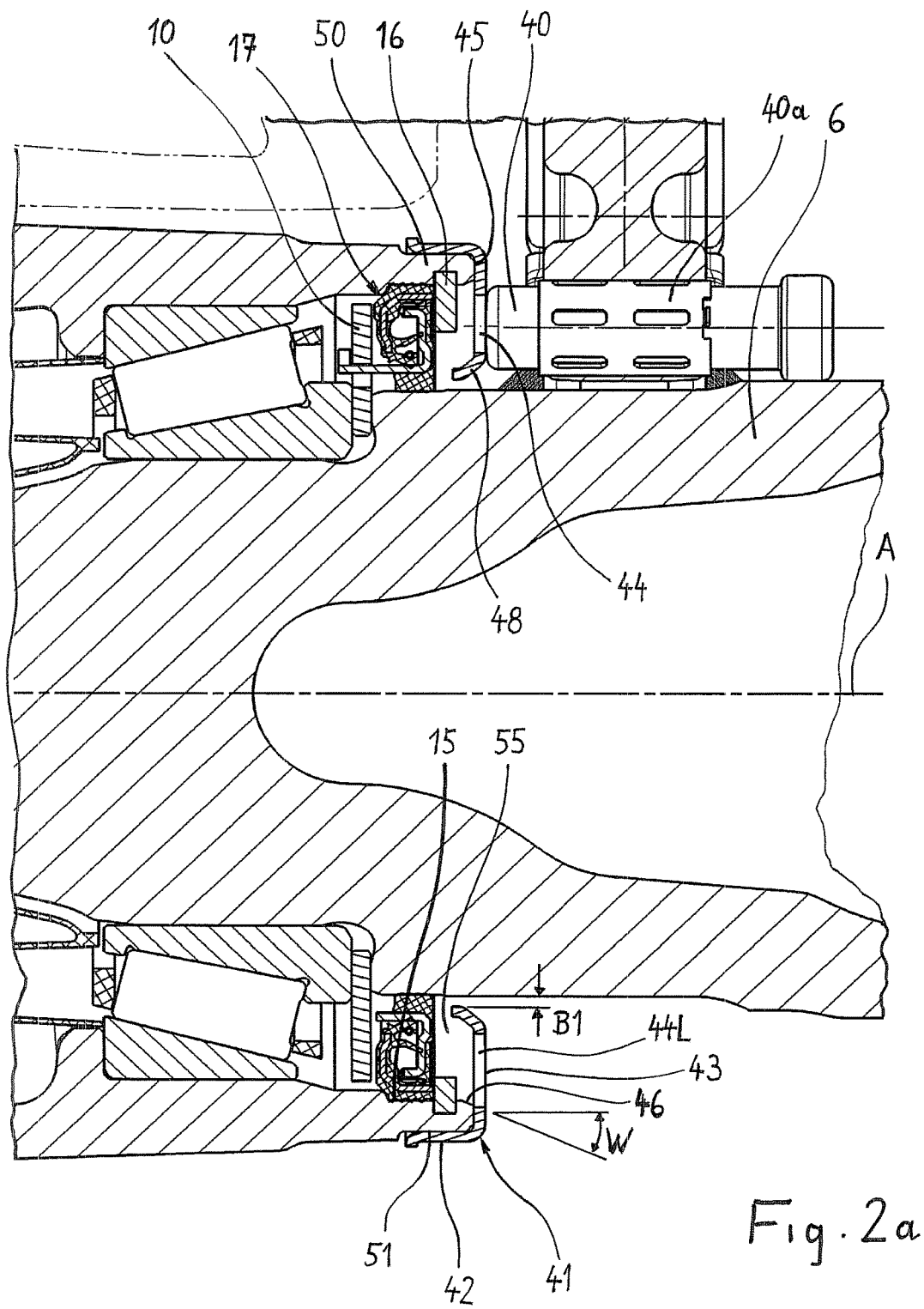
FIG. 2a an enlarged partial representation of the objects according to FIG. 2 in the region of the hub neck of the wheel hub.

Preferentially, as represented in FIG. 2a, the width B1 of the residual opening, remaining by reason of the covering, between the inner edge of the pulse-generator portion 43 and the outside of the axle element 6 is equal to or less than the width B2 of the slots 44, 44L. Particles and, above all, small stones that can no longer pass through the slots 44, 44L on account of their small width are then reliably held back also in the region of the residual gap B1 remaining in this way.

In order additionally to improve the drainage, a circumferential oblique chamfer 46 is located in the transition between the end face 45 and the inner periphery 15. This chamfer exhibits an angle W of between 20° and 65° with respect to the wheel-hub axis A, and radially exhibits an extent of at least 2 mm.

According to FIG. 3, the longer openings or slots 44L exhibit such a radial extent RL toward the outside that they reach as far as the largest radius of the oblique chamfer 46. Dirty water that has accumulated in the interior of the hub, and smaller particles of dirt, can therefore escape in every case through the outwardly elongated portions of the slots 44L, this being favored in automotive operation by the centrifugal forces.

On the other hand, in order that the pole ring 41 retains a mechanical strength that is as high as possible, all the other slots 44 only exhibit a length and, in particular, an outward extent R that is not larger than is technically necessary for the reliable sensing by the sensor 40. No appreciable drainage of the interior of the hub takes place via the shorter slots. The longer slots 44L, on the other hand, exhibit an extent RL radially outward that is larger than the extent necessary for the reliable sensing by the sensor 40. The radial extent RL reaches, for example, between 2 mm and 10 mm further outward than extent R.

Preferentially, only every second slot 44L is elongated—that is to say, exhibits the larger extent RL outward. In principle, and with substantially the same effect for the drainage that is being striven for, the number of openings 44 exhibiting the extent R necessary for the sensing may amount to an integer multiple of the openings 44L exhibiting the larger extent RL.

For the mounting of the wheel-hub assembly on the steering knuckle 6, the pole ring 41 is attached, as described, on the outer periphery 51 of the hub neck 50, the pole ring being axially supported against the end face 45 of the hub neck 50. The unit prepared in this way, consisting of wheel hub 1 and pole ring 41, is pushed onto the steering knuckle 6, with interposition of the roller bearings. Previously the sensor 40 had been arranged in the mounting sleeve 40a in such a way that the sensor 40 protrudes somewhat too far in the direction toward the wheel hub. In the course of pushing on the wheel hub, the pole ring 41 therefore strikes against the sensor 40 and pushes it back within the mounting sleeve 40a until the wheel hub 1 has taken up the final position on the steering knuckle. However, since the sensor 40 is seated relatively tightly in the mounting sleeve 40a, the driving of the sensor by entrainment results in a distinct load—and, in particular, bending load—on the pole ring 41. This is the reason why, as previously described, the mechanical strength of the pole ring 41 is of particular importance.

LIST OF REFERENCE SYMBOLS 1 wheel hub
2 flange
4 brake disk
5A,B roller bearings
6 steering knuckle
7 wheel bolt
10 ring
15 inner periphery of the wheel hub
16 circlip
17 seal
40 sensor
40a mounting sleeve
41 pole ring
42 attachment portion
43 pulse-generator portion
44 slot, opening
44L elongated slot, elongated opening
45 end face
46 chamfer
48 bead
50 hub neck
51 outer periphery
55 opening
A central axis
B1 width, residual gap
B2 width
R extent
RL extent
W angle

What is claimed is:

1. A wheel-hub assembly for a vehicle wheel, the wheel hub assembly comprising:
a wheel hub (1) configured to be rotatably arranged on a torsion-resistant steering knuckle (6) via a hub bearing assembly, wherein the wheel hub (1) comprises a hub neck (50), wherein the hub neck (50) comprises a central opening configured to centrally receive the steering knuckle (6) along a wheel-hub axis (A),
a pole ring (41) of an ABS sensor comprising an attachment portion (42) mounted to a radially outer periphery of on the hub neck (50), wherein the pole ring (41) comprises a pulse-generator portion (43) integrally formed with the attachment portion (42), wherein the pulse-generator portion (43) extends, starting from the attachment portion (42), toward the wheel-hub axis (A) and is provided with openings (44, 44L), uniformly distributed about the pulse-generator portion (43) in a circumferential direction of the pole ring (41), wherein the pulse-generator portion (43) extends toward the wheel-hub axis (A) to such an extent that an annular opening (55) formed between an inner periphery (15) of the hub neck (50) of the wheel hub (1) and the steering knuckle (6), when the wheel hub (1) is mounted on the steering knuckle (6), is covered toward an interior of the wheel hub (1) and a residual gap (B1) is formed between an inner edge of the pulse-generator portion (43) and an outside of the steering knuckle (6), wherein through the residual gap (B1) the annular opening (55) communicates with a space beyond that which is sealed between the hub and the knuckle, wherein the radially inner edge of the pulse-generator portion (43) is provided with a bead (48).

2. The wheel-hub assembly as claimed in claim 1, wherein the pole ring (41) covers the annular opening (55) between the inner wall of the hub neck (50) of the wheel hub (1) and the steering knuckle (6) in a proportion amounting to at least 80% of a cross-sectional area of the annular opening (55).

3. The wheel-hub assembly as claimed in claim 1, wherein the openings of the pulse-generator portion (43) are slots (44, 44L) and a width (B1) of the residual gap is equal to or less than a width (B2) of the slots (44, 44L).

4. The wheel-hub assembly as claimed in claim 1, wherein the steering knuckle (6) exhibits a round cross section in the region of the annular opening (55).

5. The wheel-hub assembly as claimed in claim 1, wherein the pole ring (41) consists of sheet metal and is made by stamping and bending.

6. The wheel-hub assembly as claimed in claim 1, wherein, for mounting the pole ring (41), the outer periphery (51) of the hub neck (50) of the wheel hub (1) is machined in the attachment region and provided with a rust-inhibiting layer or with a rust-inhibiting lacquer coating.

7. The wheel-hub assembly as claimed in claim 1, wherein the pole ring (41) is pressed onto the outer periphery (51) of the hub neck (50) of the wheel hub (1) and is held at the outer periphery (51) of the hub neck (50) exclusively by frictional engagement.

8. The wheel-hub assembly as claimed in claim 1, wherein the pole ring (41) is axially supported on an end face (45) of the hub neck (50), wherein the end face (45) of the hub neck (50) is formed between the inner periphery (15) and the outer periphery (51).

9. The wheel-hub assembly as claimed in claim 8, wherein a transition between the end face (45) and the inner periphery (15) of the hub neck (50) is provided with a circumferential oblique chamfer (46).

10. The wheel-hub assembly as claimed in claim 9, wherein the oblique chamfer (46) exhibits an angle (W) of between 20° and 65° with respect to the wheel-hub axis (A), and exhibits a radial extent of at least 2 mm.

11. The wheel-hub assembly as claimed in claim 3, wherein the pole ring (41) is axially supported on an end face (45) of the hub neck (50), wherein a transition between the end face (45) and the inner periphery (15) of the hub neck (50) is provided with a circumferential oblique chamfer (46), and wherein at least some of the openings or slots exhibit an outward extent (RL) that extends at least as far as a radius of the inner periphery (15) of the hub neck (50).

12. The wheel-hub assembly as claimed in claim 11, wherein the outward extent (RL) extends as far as a largest radius of the oblique chamfer (46).

13. A pole ring of an ABS sensor for sensing the rotation of a vehicle wheel, the pole ring comprising an attachment portion (42) that mounts the pole ring on a radially outer periphery of a hub of a vehicle wheel, and further comprising a pulse-generator portion (43) integrally formed with the attachment portion (42), wherein the pulse-generator portion (43) extends, starting from the attachment portion (42), as a ring, closed in a circumferential direction of the pole ring (41), toward a pole-ring axis (A) in a radial direction and is provided exclusively with radial openings (44, 44L) extending in the radial direction and uniformly distributed in the circumferential direction, wherein some of the radial openings (44L) include first openings and second openings, wherein the first openings exhibit an outward radial extent (RL) in the radial direction that is larger than a radial extent (R) of the second openings (44), wherein the radial extent (R) of the second openings is required for a sensing operation of the ABS sensor, wherein the radially inner edge of the pulse-generator portion (43) is provided with a bead (48) and wherein the radial openings facilitate communication between a space defined by a first face of the pole ring and a bearing seal and a space defined in part by a second face of the pole ring which is opposite the first face.

14. The pole ring as claimed in claim 13, wherein the outward radial extent (RL) is between 2 mm and 10 mm larger than the radial extent (R) of the second openings (44).

15. The pole ring as claimed in claim 13, wherein the number of the second openings (44) amounts to an integral multiple of the first openings (44L).

16. The pole ring as claimed in claim 13, wherein the second openings (44) and the first openings (44L) alternate in the circumferential direction of the pole ring.

17. The pole ring as claimed in claim 13, wherein the first openings are configured to discharge liquid and particles accumulating behind the pole ring in operation when mounted on the wheel hub.

\* \* \* \* \*